Jan. 18, 1949.  W. BRANDL  2,459,305
APPARATUS FOR MAKING INFUSIONS
Filed March 30, 1945

Inventor
Willi Brandl
by Singer, Ehlert, Stern & Carlberg
Attorneys

Patented Jan. 18, 1949

2,459,305

UNITED STATES PATENT OFFICE 2,459,305

APPARATUS FOR MAKING INFUSIONS

Willi Brandl, Zurich, Switzerland

Application March 30, 1945, Serial No. 585,618

5 Claims. (Cl. 99—281)

A well known and practical coffee infuser comprises a container for cold water, placed at higher level than the other parts of the apparatus, from which the water passes through a heating chamber to the ground coffee contained in a percolator.

This invention has reference to an improved apparatus of the aforementioned type, suitable for making and dispensing small and medium quantities of coffee or other infusions such as tea, which is of a simple and reliable construction and is developed to a portable unit requiring no installations or connections apart from a flexible wire for the electric current supply for heating the water.

In the case of coffee the quality of the beverage is affected adversely by the use of boiling water, which has suffered a partial decomposition of the natural carbonate content. The apparatus according to my invention supplies the percolator with hot water immediately after this has attained the most suitable temperature and thereby automaticaly avoids the use of boiling water, which has deteriorated by prolonged heating.

To the accomplishment of the foregoing and such other objects as may hereinafter appear, my invention consists in the elements and their relation one to the other as hereinafter described, reference being made to the accompanying drawings which show a preferred embodiment of my invention and in which.

Figure 1:
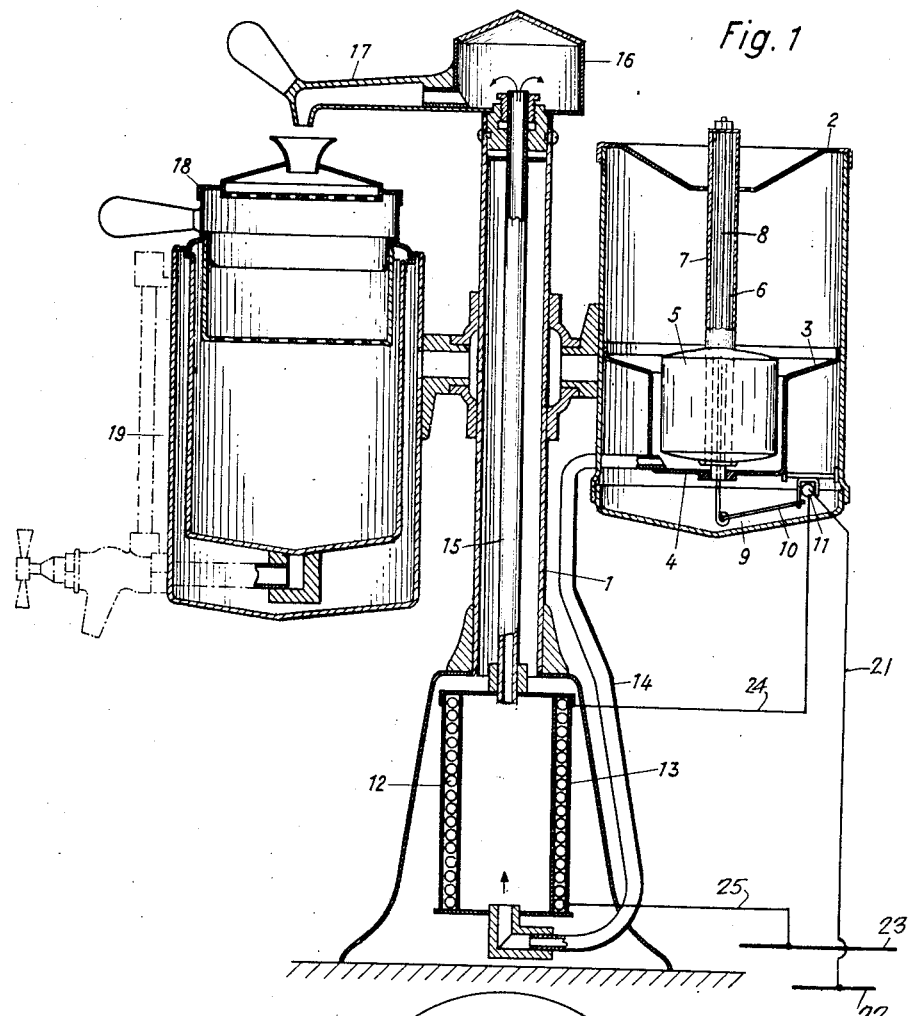
Fig. 1 is a sectional elevation of the complete apparatus.
Figure 2:
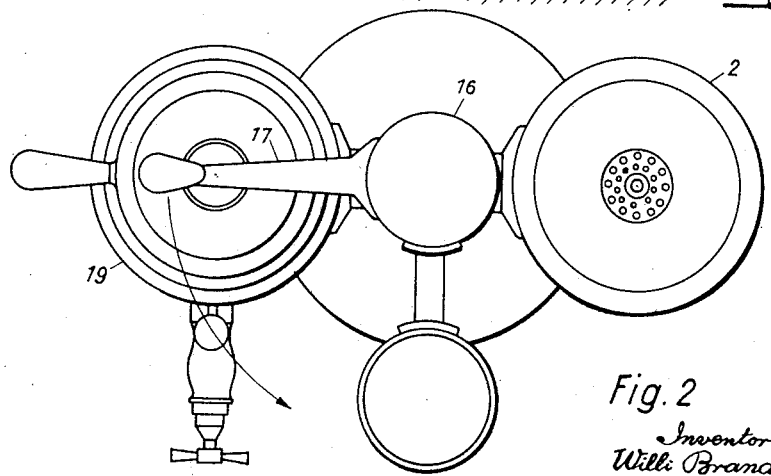
Fig. 2 is a top plan view of the same.

The apparatus possesses a column and pedestal 1, to which the container 2 is fixed. The partition 3 provides the bottom of the receptacle for the cold water and comprises a neck and a central cylindrical extension piece in which a movable float 5 is arranged. This float 5 is provided with a vertical tube 7. A second tube 6 is fixed to the bottom of the water container in such a manner that it acts as a guide for the tube 7 connected to the float. A stem 8 is fixed to the upper end of the tube 7 and passes through the inner tube 6 and is connected at the lower end to the lever 9 which works an electric switch 11. The latter has one of its contacts connected by a conductor 21 with a main line 22, while the other switch contact is connected by a conductor 24 with one end of a heating element 12 the other end of which is connected by a conductor 25 to the other main line 23 of a power supply source. By this arrangement the rising float switches the current supply to the heating element 12 of the heating chamber 13 on, and the sinking float cuts the current supply off. The cold water from the container is conveyed to the heating chamber by the pipe 14. From the heater 13 the boiling water rises through the pipe 15 to a movable head piece 16 on the top of the column 1. The level of the outlet of the pipe is situated above the highest water level in the container 2. The head 16 is provided with an overflow 17 which can be adjusted to a position immediately above the percolator 18, which is exchangeable. The coffee beverage is collected in a double walled urn 19 from which it is dispensed by the aid of a faucet. The infuser and the water container are arranged in such a manner that by turning the outlet 17 hot water can also be supplied to the water container 2, whereby it circulates through the piping 14 and 15, the revolving head 16 and the outflow 17 back to the water container 2. The outlet 17 can also serve to supply hot water for other purposes by turning it to the front. Incrustations in the system can be removed by the addition of suitable chemicals to the circulating flow of hot water.

To make coffee cold water is poured into the container 2 in sufficient amount to supply the required quantity of beverages. As soon as the water flows into the space 4 the float 5 rises. The current supply to the heater 13 is hereby switched on, the water rises through the piping 15 to the head piece 16 and flows through the outlet 17, as soon as the temperature has increased to a sufficient degree. Between the overflow 17 and the percolator 18 a slit remains open that allows the observation of the outflow. The float 5 switches off the current supply as soon as the water in the deepest part of the container has flowed down, whereby the further outflow of hot water to the percolator is inhibited. The heater is only in action so long as an available water supply exists in container 2.

The container 2 is suitably provided with a funnel-shaped cover to facilitate the pouring in of the cold water.

The whole apparatus is exceedingly simple, no pipe lines necessitate installations. The apparatus can readily be moved from place to place and the initial cost and the running expenses are both low.

What I wish to secure by United States Letters Patent is:

1. In an apparatus for making infusions, such as coffee or tea, a vertical hollow column, a heating chamber provided with an electric heating element arranged in the lower portion of said hollow column, a vertical pipe extending from said heating chamber upwardly toward the upper end of said hollow column, a discharge spout for heated water rotatably mounted on the upper end of said hollow column and in continuous communication with said vertical pipe, an open cold water container extending laterally from said column and fixedly secured thereto at an elevation above said heating chamber, a pipe connecting the bottom of said cold water container with the bottom of said heating chamber for conducting water by gravity into said heating chamber, a float in said cold water container, an electric switch, means operatively connecting said float with said electric switch whereby said switch will be automatically opened when the float touches the bottom of said cold water container and will be automatically closed when the float is lifted from said bottom, as by water poured into said open cold water container, and conductor means connecting said switch in circuit with said electric heating element and with a source of electric power.

2. In an apparatus for making infusions, such as coffee or tea, a vertical hollow column, a heating chamber provided with an electric heating element arranged in the lower portion of said hollow column, a vertical pipe extending from said heating chamber upwardly toward the upper end of said hollow column, a discharge spout for heated water rotatably mounted on the upper end of said hollow column and in communication with said vertical pipe, a cold water container extending laterally from said column and fixedly secured thereto at an elevation above said heating chamber, a pipe connecting the bottom of said cold water container with the bottom of said heating chamber, a vertical tube secured to the bottom of said cold water container, a float in said cold water container and secured to the lower portion of another tube which is slidably mounted on the outside of said vertical tube, said other tube extending with its upper end from the upper end of said cold water container, a rod carried by said other tube and extending through said vertical tube and projecting with its lower end from the bottom of said cold water container, an electric switch, means operatively connecting the lower end of said rod with said electric switch whereby said switch will be automatically opened when the float touches the bottom of said cold water container and will be automatically closed when the float is lifted from said bottom as by water filled into said cold water container, and conductor means connecting said switch in circuit with said electric heating element and with a source of electric power.

3. In an apparatus for making infusions, such as coffee or tea, a vertical hollow column, a cylindrical heating chamber surrounded by a cylindrical electric heating element arranged in the lower portion of said hollow column, a vertical pipe extending from the upper end of said heating chamber upwardly toward the upper end of said hollow column, a beverage urn provided with an infusion strainer carried by said vertical column, a cold water container open at its upper end and closed at its bottom extending laterally from said column and fixedly secured thereto at an elevation above said heating chamber, the lower portion of said cold water container being formed of a cylindrical portion of smaller cross sectional area than the upper portion, a discharge spout for heated water rotatably mounted on the upper end of said hollow column and in continuous communication with said vertical pipe, said discharge spout being adapted to be moved selectively over said beverage urn and over said cold water container to visibly discharge hot water into the same, a cylindrical float in the lower cylindrical portion of said cold water container, an electric switch mounted on the lower face of the bottom of the cold water container, means operatively connecting said float with said electric switch whereby said switch will be automatically opened when the float touches the bottom of said cold water container and will be automatically closed when the float is lifted from said bottom as by water filled into said cold water container, and conductor means connecting said switch in circuit with said electric heating element and with a source of electric power.

4. In an apparatus for making infusions, such as coffee or tea, a vertical tubular column, a cylindrical heating chamber surrounded by a cylindrical electric heating element arranged in the lower portion of said tubular column, a vertical pipe extending from the upper end of said heating chamber upwardly toward the upper end of said tubular column, a beverage urn provided with an infusion strainer carried by said vertical column, an open cold water container extending laterally from said column and fixedly secured thereto at an elevation above said heating chamber, a discharge spout for heated water rotatably mounted on the upper end of said tubular column and in continuous communication with said vertical pipe, said discharge spout being adapted to be moved selectively over said beverage urn and over said cold water container to visibly discharge hot water into the same, a vertical tube in said cold water container and secured to the bottom thereof, a float in said cold water container and secured to the lower portion of another tube which is slidably mounted on the outside of said vertical tube, said other tube extending with its upper end from the upper open end of said cold water container, a rod secured to the upper end of said other tube and extending through said vertical tube and projecting with its lower end from the bottom of said cold water container, an electric switch mounted on the lower face of the bottom of said cold water container, means operatively connecting the lower end of said rod with said electric switch whereby said switch will be automatically opened when the float touches the bottom of said cold water container and will be automatically closed when the float is lifted from said bottom, as by water filled into said cold water container, and conductor means connecting said switch in circuit with said electric heating element and with a source of electric power.

5. In an apparatus for making infusions, such as coffee or tea, a vertical hollow column, a heating chamber provided with an electric heating element arranged in the lower portion of said hollow column, a vertical pipe extending from the upper end of said heating chamber upwardly toward the upper end of said hollow column, a discharge spout for heated water rotatably mounted on the upper end of said hollow column and in continuous communication with said vertical pipe, an open cold wated container extending laterally from said column and fixedly secured thereto at an elevation above said heating chamber, a pipe connecting the bottom of said cold water container with the bottom of said heating chamber, means falling and rising with the water level in said cold water container, an electric switch, means operatively connecting said means with said electric switch whereby said switch will be automatically opened when said means reaches the level of the bottom of said cold water container and will be automatically closed when said means is raised above the level of said bottom, and conductor means connecting said switch in circuit with said electric heating element and with a source of electric power.

WILLI BRANDL.

REFERENCES CITED

The following references are of record in the file of this patent:

UNITED STATES PATENTS

| Number | Name | Date |
|---|---|---|
| 1,472,551 | Capocci | Oct. 30, 1923 |
| 1,852,356 | Mercier | Apr. 5, 1932 |
| 2,346,389 | Peters et al. | Apr. 11, 1944 |

FOREIGN PATENTS

| Number | Country | Date |
|---|---|---|
| 196,940 | Switzerland | July 1, 1938 |
| 380,414 | Great Britain | Sept. 15, 1932 |
| 450,759 | Great Britain | July 15, 1936 |
| 433,546 | France | Oct. 30, 1911 |
| 566,915 | France | Nov. 28, 1923 |
| 763,314 | France | Feb. 12, 1933 |